Patented Jan. 13, 1931

1,789,071

UNITED STATES PATENT OFFICE

WILLIAM J. HALE AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN

MANUFACTURE OF PHENOLIC COMPOUNDS

No Drawing. Application filed September 1, 1927. Serial No. 217,016.

It is well known that benzene sulphonic acid in the form of its sodium salt when brought into reaction with caustic soda in state of fusion and at a temperature of 300°–375° C., suffers hydrolysis with the production of phenol, in the form of sodium phenate, and sodium sulphite.

This hydrolysis may also be accomplished in aqueous solutions and at approximately the same temperatures when the reaction is carried out in autoclaves, as is described in the patent to Aylsworth No. 1,213,142. Under these latter conditions, however, there is produced a considerable portion of diphenyl oxide due to the secondary reactions set up between the sodium phenate under formation and the sodium benzene sulphonate as yet unacted upon by the caustic alkali. This production of diphenyl oxide is all the more marked in the presence of increasing amounts of water as well as in length of time of preheating of reaction components, such that present practice, as concerns the use of sodium benzene sulphonate, favors especially those hydrolytic operations conducted in highly concentrated media. A process employing benzene sulphonate, without these drawbacks is highly desirable.

To the accomplishment of the foregoing and related ends, the invention, then, consists of the features hereinafter fully described, and particularly pointed out in the claims, the following description setting forth in detail certain features embodying the invention, these being illustrative however of but one of the various ways in which the principle of the invention may be employed.

Diphenyl oxide may be converted into phenol by the hydrolytic action of an alkali metal or alkaline earth hydroxide or in fact by almost any salt of a strong base and a weak acid, when in aqueous solution, if the reaction mixture be heated under pressure to a temperature of 300° C. and over.

In proceeding in accordance with my invention, the reaction mass, consisting of a benzene sulphonic acid derivative, diphenyl oxide, and an aqueous solution of some hydrolyzing agent such as caustic soda or potash or alkaline earth hydroxide or a salt of a strong base and a weak acid, is brought together in an autoclave, or a tubular system if the operation is to be made continuous, and is heated to a temperature of 300° to 375° C. without a catalyst or preferably in the presence of a catalyst, for instance copper. The presence of copper not only speeds up the reaction but somewhat slightly lowers the optimum temperature of reaction. Upon completion of the foregoing operation, requiring in general not over one-half hour, the reaction mixture is removed from the autoclave, (continuously in the case of a tubular type of autoclave), and the diphenyl oxide is separated from this mixture and is again entered into the system at the initial stage. The phenate or phenolic liquor itself may be worked up to yield pure phenol. The diphenyl oxide, however, as indicated, is returned, and as it passes and repasses through the system will not be measurably increased in quantity.

An equilibrium between diphenyl oxide and phenol is obtained at temperatures approximating 300° C. and above. Much below 300° C. diphenyl oxide undergoes only slight hydrolysis, hence any attempts at the lower temperatures to drive the equilibrium in the direction of the phenol by increasing the concentration of the diphenyl oxide will have little or no practical effect. However, at approximately 340° C., the hydrolysis of diphenyl oxide proceeds with ease.

There is in general introduced into the aqueous mixture of reaction components approximately that same proportion of diphenyl oxide as will of itself be found to have formed at approximately 300° C. or above when the same benzene sulphonic acid derivative and an aqueous solution of caustic soda are heated alone at the given temperature. This additional amount of diphenyl oxide rarely exceeds 10% of the weight of the benzene sulphonic acid derivative.

Under the proper conditions the reaction system of a benzene sulphonic acid derivative and an aqueous solution of a hydrolyzing agent is thus maintained in an approximate state of equilibrium with respect to diphenyl oxide on the one hand and phenol (phenate) on the other, and the yield of the latter is measurably increased to a point almost quantitative.

The process as described, is not only applicable to the case of a mono-sulphonic acid benzene but is applicable likewise to sulphonic acid derivatives of homologues more generally. Thus, the toluyl sulphonic acids are likewise hydrolyzed by an aqueous solution of caustic soda and other hydrolyzing agents and directly converted into the corresponding cresols in practically quantitative yield when such hydrolysis is carried out in the presence of the correct proportion of the corresponding ditoluyl oxide.

Other modes of applying the principle of the invention may be employed, change being made as regards the details disclosed, provided the step or steps stated in any of the following claims, or the equivalent of such, be employed.

We therefore particularly point out and distinctly claim as our invention:—

1. A process for the manufacture of a phenolic compound, which comprises hydrolyzing a benzene sulphonic acid derivative in aqueous alkaline solution, diphenyl oxide being added to the reaction mixture.

2. A process for the manufacture of a phenolic compound, which comprises hydrolyzing a benzene sulphonic acid derivative in aqueous alkaline solution, diphenyl oxide being added to the initial reaction mixture in amount sufficient to maintain the system in an approximate state of chemical balance with respect thereto.

3. A process for the manufacture of a phenolic compound which comprises hydrolyzing a benzene sulphonic acid derivative in an aqueous alkaline solution, removing and separating diphenyl oxide and the phenolic compound from the reaction mixture and returning diphenyl oxide to the initial reaction.

4. A process for the manufacture of a phenolic compound, which comprises hydrolyzing a benzene sulphonic acid derivative by a caustic alkaline solution, the formation of diphenyl oxide therein being restrained by initially adding same to the reaction mixture.

5. A process for the manufacture of a phenolic compound, which comprises hydrolyzing a benzene sulphonic acid derivative by a caustic alkaline solution, removing and separating the phenolic compound and diphenyl oxide and returning the latter to the first step.

6. A process for the manufacture of a phenolic compound, which comprises hydrolyzing a benzene sulphonic acid derivative by a caustic alkali solution, and initially adding diphenyl oxide to the reaction mixture in an amount sufficient to maintain a system in an approximate state of chemical balance with respect to such compound, whereby the formation of any substantial additional amount of diphenyl oxide is prevented.

7. A process for the manufacture of a phenolic compound, which comprises hydrolyzing a benzene sulphonic acid derivative by a caustic alkali solution at a temperature of 300° to 375° C. and under a pressure greater than the vapor tension of the reacting substances, whereby an alkali metal phenate is formed together with some diphenyl oxide, and restraining the formation of such last-mentioned compound by initially adding same to the reaction mixture.

8. A process for the manufacture of a phenolic compound, which comprises mixing a benzene sulphonic acid derivative with caustic alkali solution, causing the mixture to traverse a path wherein it is subjected to a temperature of 300° to 375° C. and under a pressure greater than vapor tension of the reacting substances, whereby an alkali metal phenate is formed along with some diphenyl oxide, removing and separating such phenate and diphenyl oxide, and returning the latter to the initial reaction.

9. A process for the manufacture of phenolic compounds, which comprises hydrolyzing a sulphonic acid derivative of an aromatic hydrocarbon in aqueous alkaline solution, and adding the corresponding diaryl oxide to the reaction mixture.

10. A process for the manufacture of phenolic compounds, which comprises hydrolyzing a sulphonic acid derivative of an aromatic hydrocarbon in aqueous alkaline solution, and adding the corresponding diaryl oxide to the reaction mixture in an amount sufficient to maintain the system in an approximate state of chemical balance with respect to such oxide.

11. A process for the manufacture of phenolic compounds, which comprises hydrolyzing a sulphonic acid derivative of an aromatic hydrocarbon in aqueous alkaline solution, removing and separating the corresponding diaryl oxide and phenolic compound from the reaction mixture, and returning such oxide a subsequent reaction.

Signed by us this 30 day of August, 1927.

WILLIAM J. HALE.
EDGAR C. BRITTON.